March 12, 1929. W. BRUBAKER 1,704,784
MECHANICAL ICE CREAM DISPENSER AND THE LIKE
Filed April 30, 1926   3 Sheets-Sheet 1
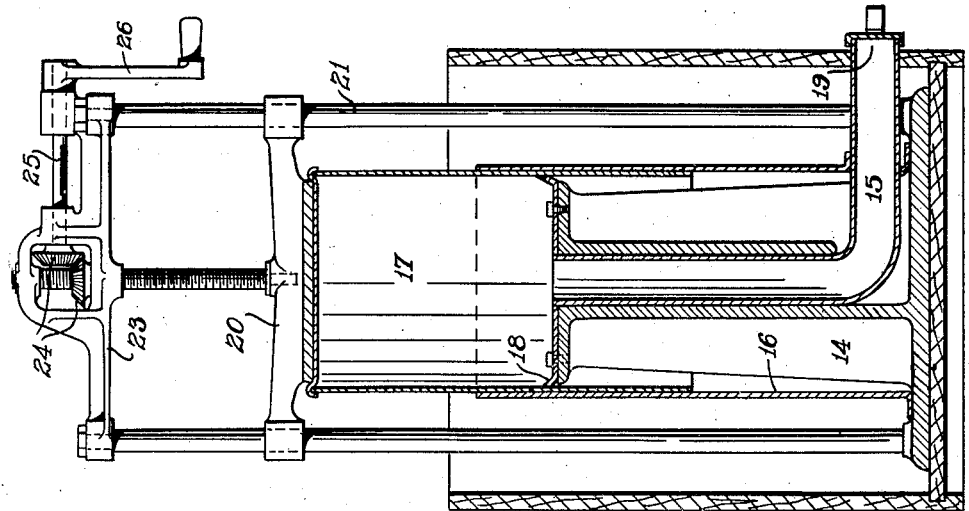
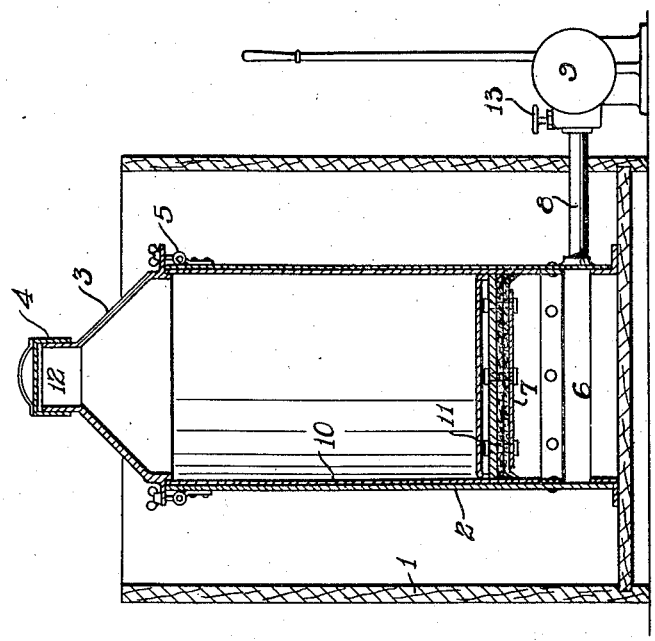
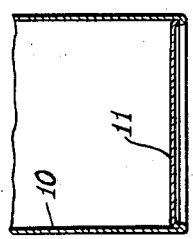
INVENTOR
BY Wesley Brubaker
ATTORNEY March 12, 1929.   W. BRUBAKER   1,704,784
MECHANICAL ICE CREAM DISPENSER AND THE LIKE
Filed April 30, 1926   3 Sheets-Sheet 2
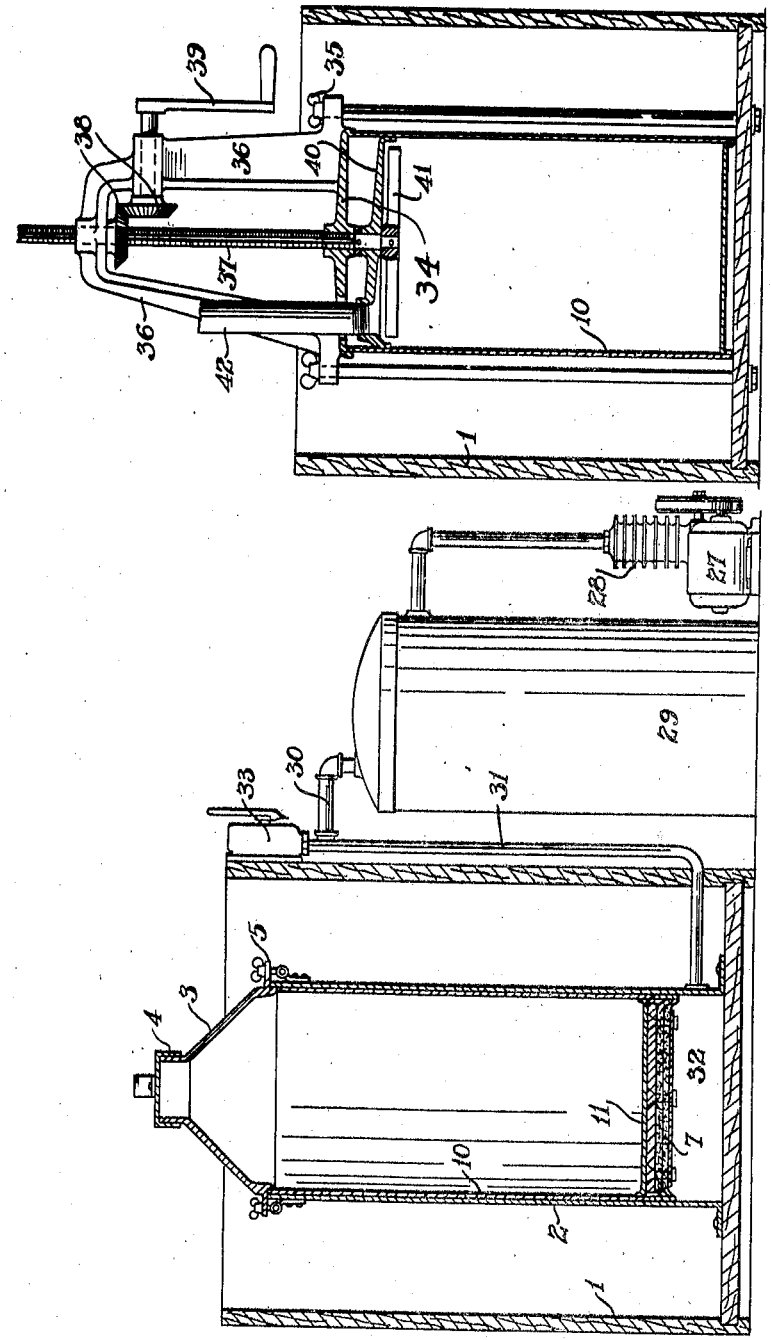

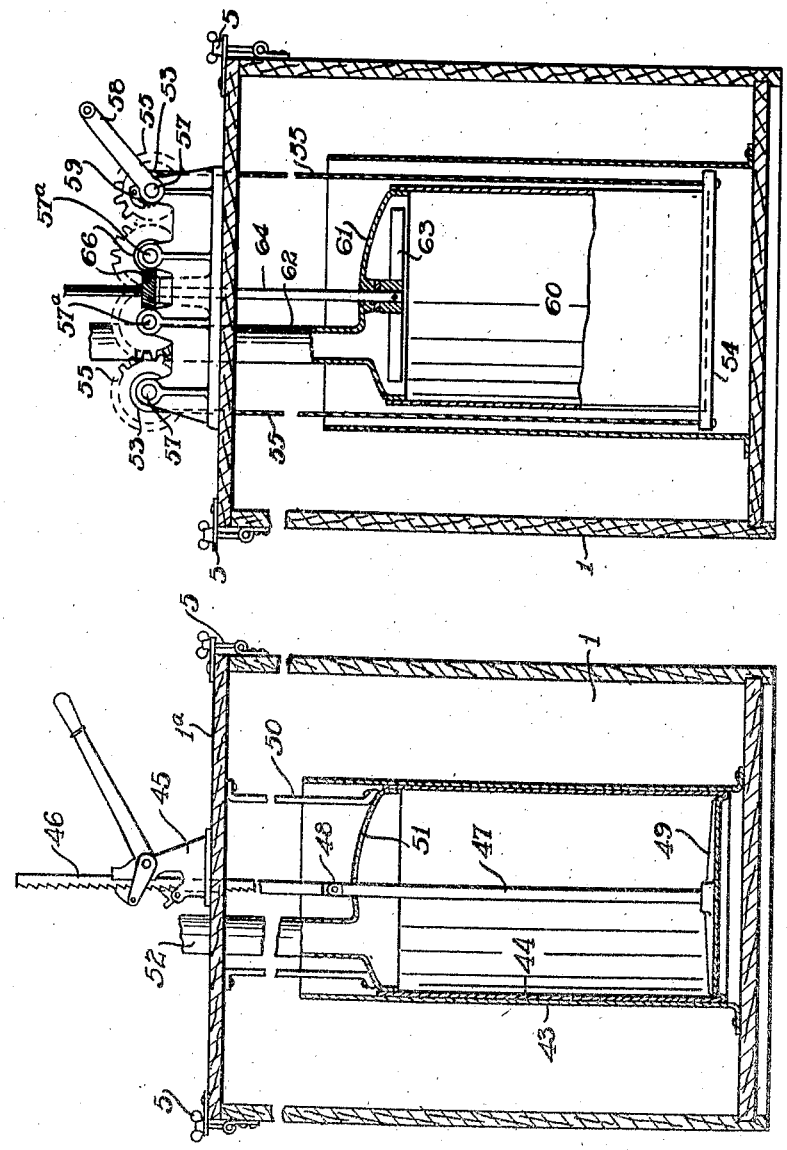

Patented Mar. 12, 1929.

1,704,784

UNITED STATES PATENT OFFICE.

WESLEY BRUBAKER, OF SAVANNAH, OHIO.

MECHANICAL ICE-CREAM DISPENSER AND THE LIKE.

Application filed April 30, 1926. Serial No. 105,817.

This invention relates to mechanical ice cream dispensers.

The objects attained in the invention consist in mechanical means for dispensing ice cream from refrigerator or ice tub cans in which ice cream is commonly furnished in bulk to distributors, thus effecting greater sanitation in handling and serving the cream and substituting mechanical means easy of operation for the common and difficult practice of dipping the cream by hand.

My invention as herein illustrated and described sets forth a principle of mechanical organization as well as specific forms of construction for dispensing ice cream from cans, both the principle and the constructions here shown for illustrative purposes being broadly new in the art as far as I am aware.

As illustrated in the accompanying drawings, described in the detailed specification and defined and comprehended in the appended claim, the principle of invention comprises suitable apparatus for raising the cream bodily in the can by manually operable or suitable power means, as compressed air, hydraulic or electrical motors, thus to deliver the cream in measured portions through a suitable serving tube or spout arranged at the top of the can.

In a modified form the same principle of construction is applied for forcing the cream from the can by applying downward pressure to the body of the cream thus forcing the same upward through a serving tube.

A further modification consists in inverting the can filled with cream with its open end disposed over an apertured base approximating the diameter of the can and adapted to receive the can telescopically thereover, thus acting as pressure is applied on the upturned bottom of the can to force the same downwardly over the apertured base to discharge the cream through a suitable serving tube or spout.

In the accompanying drawings the invention is shown in a number of representative forms to illustrate the practice of the invention. In the drawings:

Fig. 1 is a view in sectional elevation of an ice cream can and ice container illustrating the application of a hydraulic motor for raising the cream in the can;

Fig. 2 is a view in sectional elevation of the ice cream serving apparatus in which the can container is inverted for discharging the cream;

Fig. 3 is a view in sectional elevation illustrating the application of pneumatic apparatus for raising the cream in the packing can;

Fig. 4 is a view in sectional elevation illustrating a structure suitable for delivering the cream from the can by applying downward pressure on the body of the cream;

Fig. 5 is a view in sectional elevation illustrating manually operable means for raising the cream in the can;

Fig. 6 is a view in sectional elevation of a modified construction of the principle illustrated in Fig. 5, electrically operable apparatus for delivering the cream from the can;

Fig. 7 is a sectional view illustrating a detail of the ice cream can in a form used in several of the constructions here shown.

As shown in Fig. 1 the ice cream dispensing apparatus consists of the ice container 1 in which is supported a hydraulic lift comprising a cylindrical casing 2 provided with a lid 3 and cover cap 4, the lid being adapted to be firmly secured to the casing by means of pivoted wing nut and bolt connections 5. In the lower portion of the casing is a pressure chamber 6, a pressure head or piston 7, the chamber being connected by a pipe 8 to a normally operable hydraulic pump 9. The casing 2 is adapted to receive the ice cream can 10 telescopically, the can having, as here shown, a movable bottom 11 adapted to be engaged by the pressure head 7 which is adapted to operate as a piston in the can and thus to lift the cream bodily in the can to the top of the lid container 3 from which it can be served conveniently manually through the lid opening 12 or by means of a serving tube as described in connection with other figures of the drawings. Any suitable means, as an expandible gasket (not shown), may be used to prevent leakage between the casings 2—11 from the pressure chamber 6, a valve 13 serving for draining the pressure chamber when an empty can is removed and a filled can is substituted.

The apparatus illustrated in Fig. 2 comprises a base or vertically extended stand 14 supported in the ice container 1 and having a downwardly directed discharge tube 15 projecting at its lower end through the side of the ice container, its upper end being substantially flush with the top of the stand 14. Surrounding the stand is a tubular casing 16 adapted to receive the inverted ice cream can 17 telescopically, the open end of the can being disposed over the top of stand 14 which is provided with a ring 18 adapted to fit the can diametrically and to act as a piston or pressure head as the can is forced downwardly over the stand, thus acting to discharge the cream through tube 15 through the serving aperture 19. The pressure means consist of a cross-head 20 operable slidably on vertical members 21 and connected to a screw shaft 22 which is supported in a second cross-head 23 and connected by means of bevel gears 24 and shaft 25 to a crank 26 by means of which pressure is applied to the bottom of the can by direct connection with cross head 20.

The apparatus illustrated in Fig. 3 is similar in principle to that shown in Fig. 1 except that pneumatic pressure means are substituted for hydraulic pressure means for raising the body of the ice cream in the container. As here shown the apparatus includes an electrical motor 27 belt connected to an air pump 28 adapted to charge a pressure tank 29, the latter being connected by pipes 30—31 to the pressure chamber 32 in casing 2, a valve 33 serving to control the admission of air to the pressure chamber for raising the cream in the container, the action of the air being against the piston 7 which in turn acts to force the bottom 11 of the container upward in a manner similar to the action described in connection with Fig. 1.

A preferred form of construction is illustrated in Fig. 4 in which the ice cream container 10 is supported on the bottom of the ice container 1, a manually operable power head having a cross-head 34 is adapted to be disposed over the cream container and firmly secured relative thereto by vertically extended rods secured in the bottom of the ice container and to the power head by means of wing nuts 35 thus providing for convenient removal of the power head to permit of placing and removing the cream container from the ice container. The power head further comprises a frame structure 36 in which is supported a vertically slidable screw shaft 37 connected by bevel gears 38 to an operating crank 39. The lower end of the screw shaft has a bearing support in cross-head 34, the end of the shaft extending through the cross-head and butting against a pressure head 40 operable as a piston in the cream container 10. A reduced end of the screw shaft extends through part 40 and has an agitator 41 secured thereto for breaking the compactness of the cream in advance of the downward movement of the pressure head in the container, the under side of the pressure head being concaved to receive the agitator within the head. A tubular connection 42 movable with the pressure head and extending upward therefrom to any suitable height above the containers 1 and 10 serves for dispensing the cream as the same is forced upward in the tube by displacement of the cream by the descending pressure head. In the construction and arrangement here shown the dispensing apparatus is adaptable for serving the cream with ease and expeditiously from ordinary ice cream cans with simple mechanical means, the arrangement also affording complete sanitation in the handling and dispensing of the food product.

The construction illustrated in Fig. 5 comprises a cylindrical casing 43 supported in the ice container, the upper end of the casing being open and adapted to receive the cream container 44. The ice container, as here shown, is provided with a lid 1$^a$ secured thereto by wing nut 5. A jack 45 coacting with a notched bar 46 which is connected to a rod 47, as at 48, which is secured in the bottom 49 of the cream container, serves for moving the ice cream container upward. Secured to and depending from the under side of lid 1$^a$ by means of brackets 50 is a stationary head 51 adapted to enter the open end of container 44 as the same is drawn upward by operating the jack, the pressure thus exerted on the body of the cream in the container acting to force the same upward through a dispensing tube 52 extended through the lid 1$^a$.

The construction illustrated in Fig. 6 is a modification of that shown in Fig. 5. As here shown, opposite geared drums 53 are connected to a suspended base 54 by cables 55, there being four of the drums arranged on two shafts 57 interconnected one with another by gears 55 and idler shafts 57$^a$, one of the shafts 57 being provided with a crank 58 for operating the pulleys to raise the base 54 and with it the ice cream container 60, a ratchet 59 on the operating shaft acting to prevent reverse movement of the shaft when the crank is released. The pressure head 61 and dispensing tube 62 function similar to the head 51 and tube 52 for delivering the cream from the can as the container is drawn upward, an agitator 63 driven from one of the shafts 57$^a$ through shaft 64 and spiral gears 66 acting to break-up the compactness of the cream similar to the action of the agitator 41 described in connection with Fig. 4.

Having described my invention, I claim:

An ice cream dispensing apparatus consisting in means for supporting an ordinary container for ice cream in bulk, in combination with a pressure head adapted to be disposed over the open end of the container, including a passage through the head for cream delivered from the container, means for moving the container upward for exerting pressure on the cream for forcing the same through said passage, and agitating means operably associated with the pressure head for breaking-up the cream adjacent said passage.

In testimony whereof, I affix my signature.

WESLEY BRUBAKER.